(12) United States Patent
Leske

(10) Patent No.: US 6,404,146 B1
(45) Date of Patent: Jun. 11, 2002

(54) METHOD AND SYSTEM FOR PROVIDING TWO-DIMENSIONAL COLOR CONVERGENCE CORRECTION

(75) Inventor: Lawrence A. Leske, San Carlos, CA (US)

(73) Assignee: Innovision Corporation, Cupertino, CA (US)

( * ) Notice: Subject to any disclaimer, the term of this patent is extended or adjusted under 35 U.S.C. 154(b) by 0 days.

(21) Appl. No.: 09/773,060

(22) Filed: Jan. 31, 2001

(51) Int. Cl.[7] ................................................. G09G 1/28
(52) U.S. Cl. ............................. 315/368.11; 315/368.13; 315/370; 348/807; 348/746
(58) Field of Search ....................... 315/368.11, 368.12, 315/367, 370, 371, 368.13; 348/383, 429, 538, 560, 687, 746, 807

(56) References Cited

U.S. PATENT DOCUMENTS

| 4,401,922 | A | | 8/1983 | Kamata et al. ............. 315/368 |
| 4,730,216 | A | | 3/1988 | Casey et al. ................ 358/140 |
| 5,136,398 | A | * | 8/1992 | Rodriguez-Cavazos et al. ........................ 315/399 |
| 5,161,002 | A | * | 11/1992 | Rodriguez-Cavazos et al. ...................... 315/368.11 |
| 5,396,257 | A | * | 3/1995 | Someya et al. .............. 345/1.1 |
| 5,532,765 | A | * | 7/1996 | Inoue et al. ................ 348/177 |

* cited by examiner

Primary Examiner—Haissa Philogene
(74) Attorney, Agent, or Firm—Sawyer Law Group LLP

(57) ABSTRACT

A method and system for providing two-dimensional convergence correction for a color cathode ray tube (CRT) is disclosed. The CRT displays an input video signal comprising a stream of video scan lines which include red, green and blue color signals that are to be displayed on corresponding scan lines and subpixel locations of a display screen. The method and system include storing a plurality of scan lines from the video signal into a buffer. For a particular red, green and blue color signal, horizontal and vertical distortion of the red and blue subpixels in relation to a position of the green subpixel on the display screen are measured. Then, at least one math function is generated that mathematically represents the distortions. Finally, the math functions are applied to control circuitry to control timing of red and blue subpixels read from the frame buffer so that output of the red and blue subpixels are coincident with output of the green subpixel on the display screen.

23 Claims, 5 Drawing Sheets

METHOD AND SYSTEM FOR PROVIDING TWO-DIMENSIONAL COLOR CONVERGENCE CORRECTION

FIELD OF THE INVENTION

The present invention relates to convergence distortion in color cathode ray tubes, and more particularly, to a method and system for providing two-dimensional color convergence correction.

BACKGROUND OF THE INVENTION

The primary component of a conventional television set or a computer monitor is a cathode ray tube (CRT) that displays images from an incoming video signal. A color CRT includes a display screen comprising lines of red (R), green (G), and blue (B) phosphors or pixels, and three electron guns corresponding to R, G, and B. The video signal includes a stream of video scan lines comprising R, G and B color signals that are to be displayed on corresponding scan lines and pixel locations of the display screen. The electron guns produce R, G and B electron beams that are deflected onto the screen using electromagnetic circuits such that scan lines are consecutively scanned from the top of the CRT to the bottom during vertical scanning intervals.

A white spot is created on the screen when the R, G and B electron beams coincide on the same pixel at the same intensity. Due to the geometry of the CRT, however, the electron beams travel a longer distance at the corners of the screen than at the center. The disparity in travel distance is even greater in the increasingly popular 16:9 aspect ratio televisions. Due to magnetic lensing errors and the disparity in the electron beam travel distance, the R, G and B electron beams misalign, causing convergence distortions on the CRT.

FIGS. 1A–1C are diagrams illustrating a typical color CRT convergence distortion, where the blue and red electron beams are displaced horizontally and/or vertically from the green electron beam. The goal of convergence correction is to reduce the distortion so that the red and blue electron beams more closely coincide on the same pixel as the green electron beam, as shown in FIGS. 1B and 1C.

Typical methods for convergence correction include the use of static magnets and dynamic electromagnetics. Dynamic electromagnetics apply better control on the corners of CRTs than static magnets, but dynamic electromagnetics are primarily useful only for delta beam configuration convergence correction. In addition, the use of dynamic electromagnetics adds considerably to the cost of the CRT and are therefore not suitable for use in low-end, inexpensive television sets.

Accordingly, what is needed is an improved method and system for correcting convergence distortion. The method and system should be affordable enough so that distortion correction may be applied in both high-end as well as low-end television sets. The method and system should also correct distortion in two dimensions, rather than one. The present invention addresses such needs.

SUMMARY OF THE INVENTION

The present invention provides a method and system for providing two-dimensional convergence correction for a color cathode ray tube (CRT). The CRT displays an input video signal comprising a stream of video scan lines which include red, green and blue color signals that are to be displayed on corresponding scan lines and pixel locations of a display screen. The method and system include storing a plurality of scan lines from the video signal into a buffer. For a particular red, green and blue color signal, horizontal and vertical distortion of the red and blue pixels in relation to a position of the green pixel on the display screen are measured. Then, at least one math function is generated that mathematically represents the distortions. Finally, the math functions are applied to control circuitry to control timing of red and blue pixels read from the frame buffer so that output of the red and blue pixels are coincident with output of the green pixel on the display screen.

According to the present invention, two-dimensional convergence correction is provided that effectively aligns the three colors so that all three electron beams are coincident on the display screen to form a nondistorted pixel. The present invention also takes advantages of devices that are equipped with a pre-existing frame buffers to access the scan lines on which misaligned subpixels may fall. Thus, the convergence correction does not add significantly to the cost of the device. Once a pair of red and blue misaligned subpixels are found, the output of the subpixels are timed so that their positions are mathematically shifted left/right and/or up/down as necessary to appear on the same scan line and position of a corresponding green subpixel.

DETAILED DESCRIPTION OF THE INVENTION

The present invention relates to convergence distortion in color cathode ray tubes. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
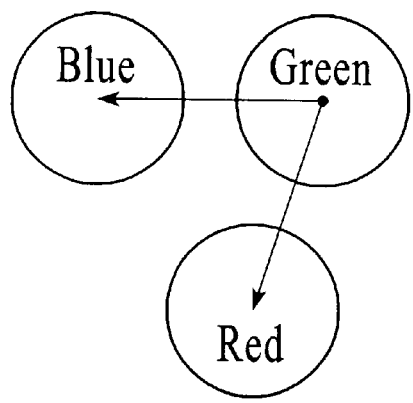
FIGS. 1A–1C are diagrams illustrating a typical color CRT convergence distortion.
Figure 1B:
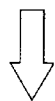
Figure 1B:
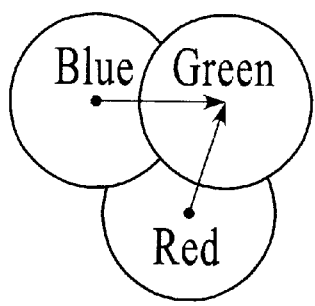
Figure 1C:
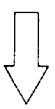
Figure 1C:
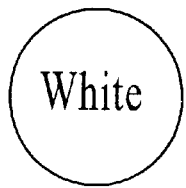
Figure 2:
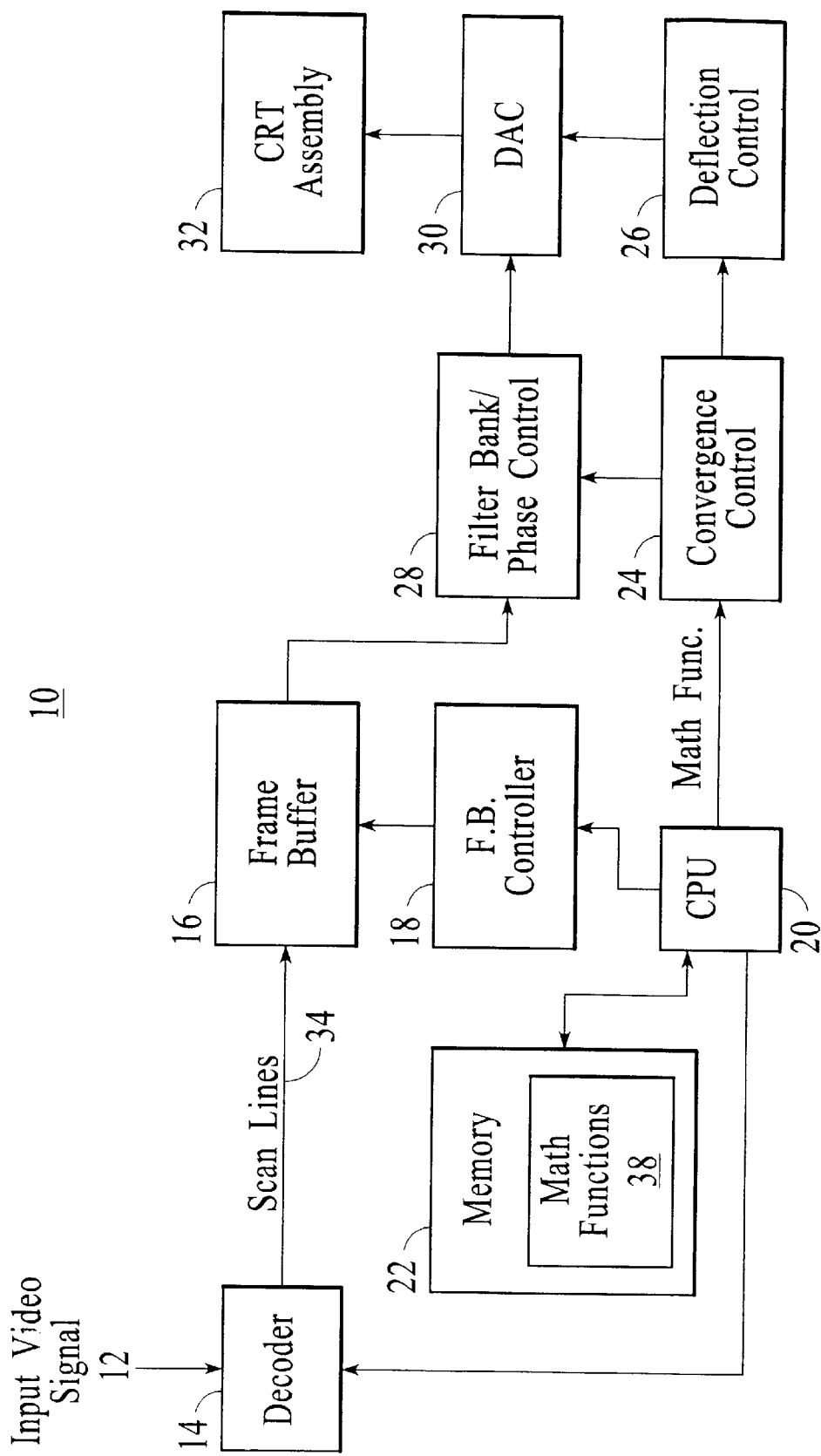
FIG. 2 is a block diagram illustrating components of a digital TV.

FIG. 2 is a block diagram illustrating components of a digital TV that may be used to implement a preferred environment of the present invention. The digital TV 10 includes a decoder 14, a frame buffer 16, a frame buffer controller 18, a CPU 20, backup memory 22, a convergence control 24, a deflection controller 26, a filter bank/phase control 28, a digital-analog-converter (DAC) 30, and a CRT magnetic lens assembly 32.

The decoder 14 receives a video signal 12 comprising a stream of video scan lines as input and converts the video signal 12 from analog to digital, if necessary. The digital scan lines 34 output from the decoder 14 are then stored in the frame buffer 16 for temporary storage. The digital TV 10 is typically provided with a frame buffer 16 for several reasons. One reason is to convert an interlace scan into a progressive scan. Traditionally, both fields of an interlace scan are stored in the frame buffer 16 so that intelligent line doubling may be performed. The second reason the digital TV 10 is provided with a frame buffer 16 is so that the digital TV 10 may be used as an Internet monitor when the frame buffer 16 is used in conjunction with CPU 20 and an operating system.

The frame buffer controller 18 controls how data is read in and out of the frame buffer 16 depending on whether input video signal 12 is interlaced or non-interlaced. Once the scan lines are read out of the frame buffer 16, the scan lines 34 are input into the poly phase convolution filter bank/phase control 28 and onto the DAC 30 for display by the CRT magnetic lens assembly 32. The convergence control 24 and the deflection controller 26 transmit signals 36 to the CRT magnetic lens assembly 32 through the DAC 30 for controlling the electron beams and for minimizing convergence distortion in accordance with the present invention, as explained further below.

Figure 3:
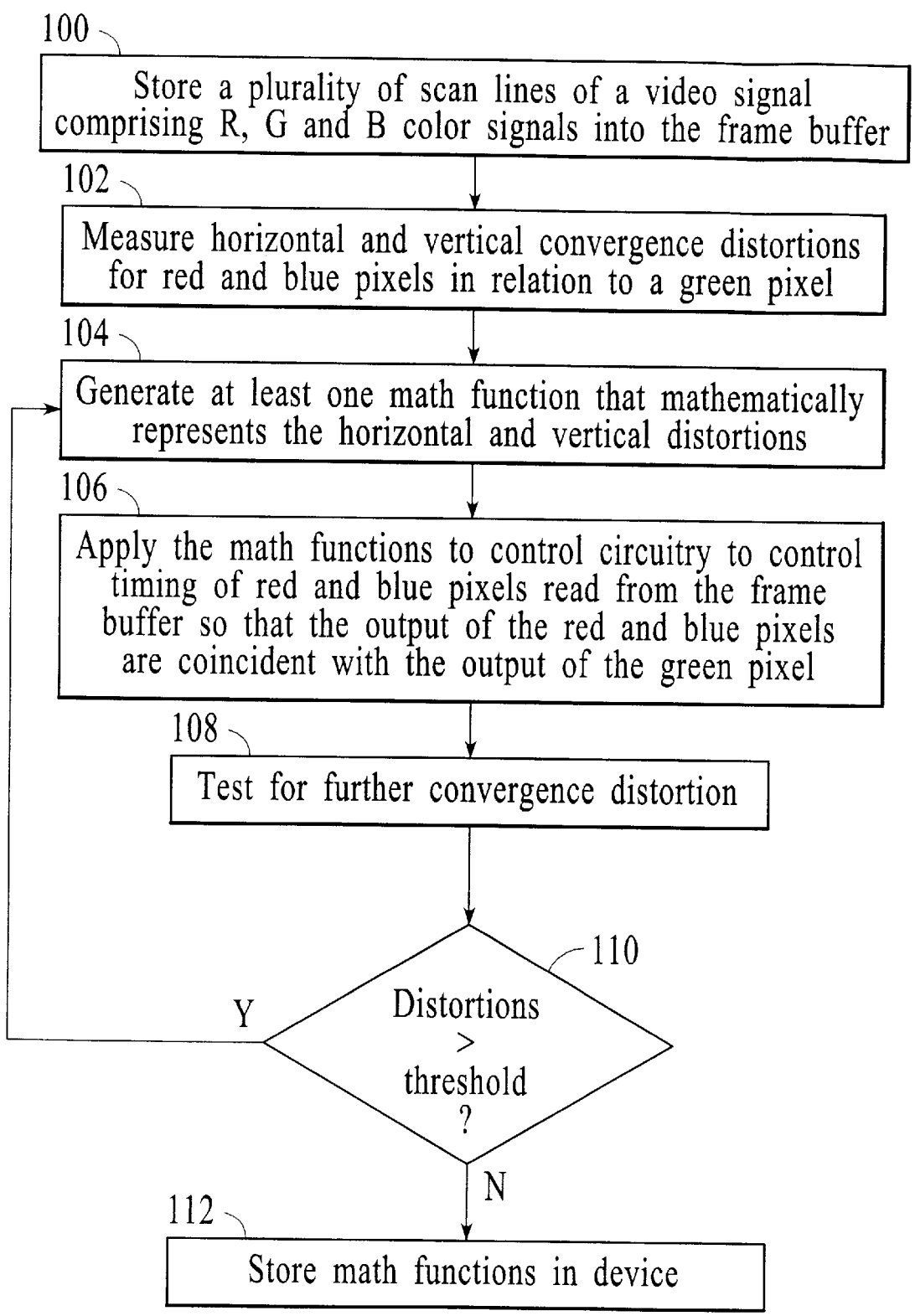
FIG. 3 is a flow chart illustrating a process for correcting convergence distortion in a color CRT.

FIG. 3 is a flow chart illustrating a process for correcting convergence distortion in a color CRT in accordance with one preferred embodiment of the present invention. The process begins by storing a plurality of scan lines of a video signal 12 comprising R, G and B color signals into the frame buffer 16 in step 100. In a preferred embodiment, the process for measuring convergence distortion and correcting the distortion occurs during manufacturing, and the video signal 12 is a test signal that displays multiple white test spots in each quadrant of the display screen. Preferably, at least three test spots are generated for each quadrant of the screen. The pixel location of each test spot on the screen is determined by the green electron beam, while the red, green and blue portions of the pixel are referred to herein as subpixels. The location of each electron beam (i.e., subpixel) on the display screen may be defined using screen coordinates, which include the scan line number (N), and the horizontal pixel position (H) within each scan line.

After the test video signal has been display, both horizontal and vertical convergence distortions are measured for red and blue subpixels in relation to a green subpixel on the CRT display screen for a particular R, G and B color signal in step 102.

Figure 4:
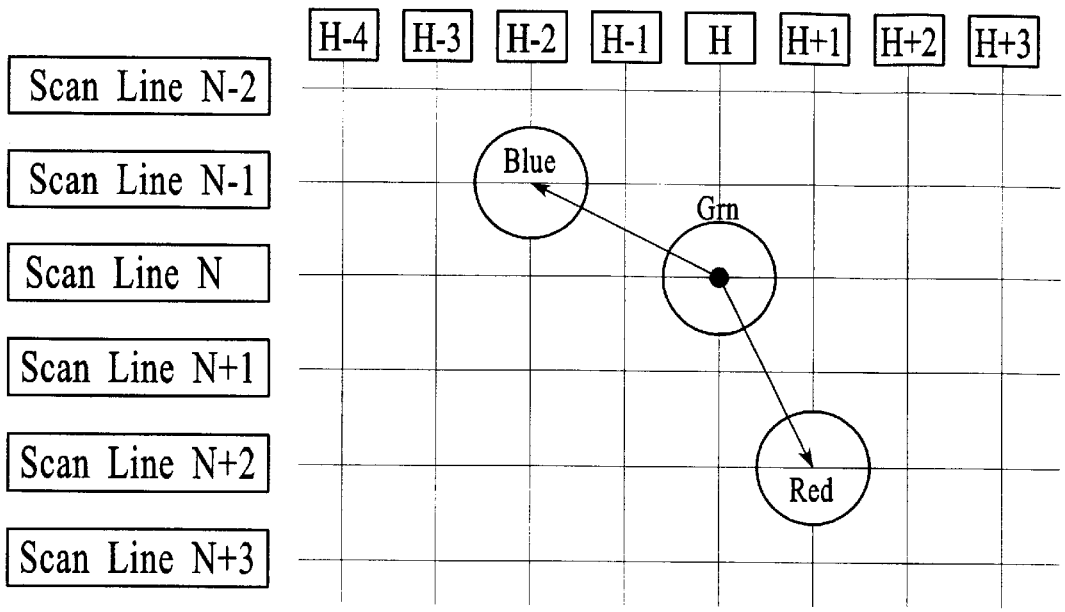
FIG. 4 is a block diagram showing a measurement of convergence distortion for an example test spot on the CRT.

FIG. 4 is a block diagram showing a measurement of convergence distortion for an example test spot on the CRT. The example shows a green illuminated subpixel in scan line N, horizontal position H. A blue illuminated subpixel is displaced from the green by −2 pixel positions horizontally and by −1 scan lines vertically. A red illuminated subpixel is displaced from the green by +1 pixel positions horizontally and by +2 scan lines vertically. In one preferred embodiment, convergence distortion of the white test spots are derived from visual inspection by an operator or light sensors, such as a video camera. In an alternative preferred embodiment, convergence distortion is automatically derived from index marks along the edges of the CRT screen through infrared detection or other similar technique.

Referring again to FIG. 3, after the horizontal and vertical convergence distortions have been measured, at least one math function that mathematically represents the horizontal and vertical distortions are generated in step 104. In a preferred embodiment, a math functions are generated for each test spot in a quadrant to provide the mathematical function of the distortion. To accurately generate a math functions, at least three test spots per quadrant are required. In a preferred embodiment, the math functions represent a best fit algorithm and may take the form of a polynomial function, a transcendental function, a tangent function, a sine function, or a cosine function, for instance.

The math functions are then applied to control circuitry to control timing of red and blue subpixels read from the frame buffer 16 so that the output of the red and blue subpixels are coincident with the output of the green subpixel on the display screen in step 106.

Figure 5:
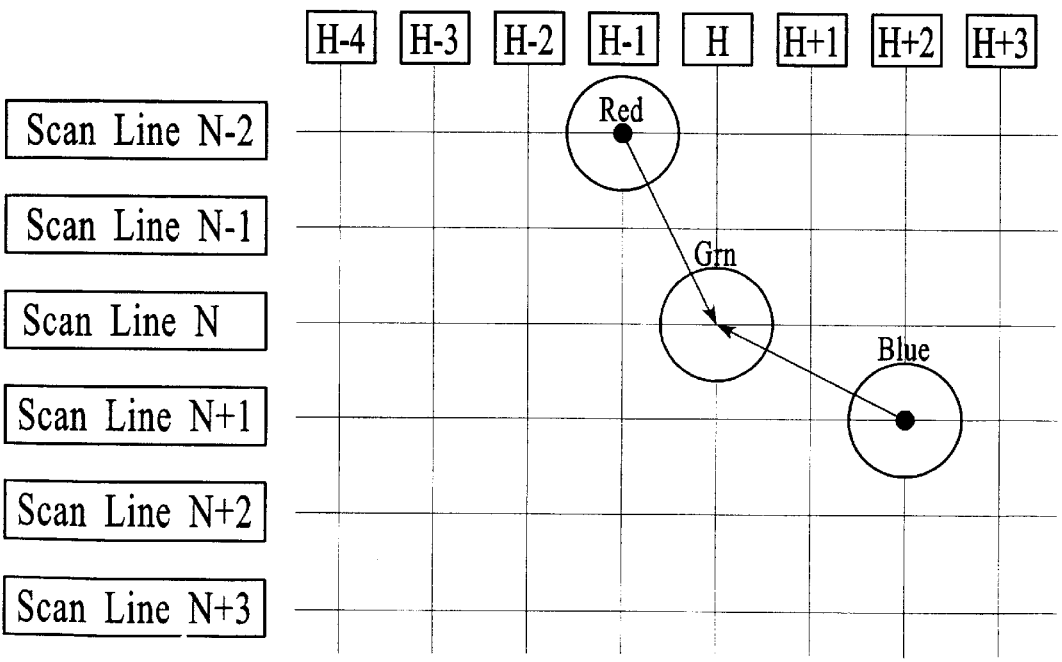
FIG. 5 is a block diagram showing two-dimensional convergence distortion correction.

FIG. 5 is a block diagram showing two-dimensional convergence distortion correction for the example test spot shown in FIG. 4. In this example, in order to place the red subpixel over the green subpixel at scan line N, horizontal position H, the math functions ensures that the red subpixel is read from the frame buffer is output two scan lines earlier than the green subpixel, during scan line N-2, at the time of horizontal position H-1, while the blue subpixel is output one scan line and two horizontal subpixel positions later in order to appear coincident with the green subpixel at N, H. This example is shown for purposes of illustration only and assumes a purely first-order linear distortion, which is seldom the case in practice.

Referring again to FIG. 3, after the math functions have been applied to control circuitry, a test is made for further convergence distortion in step 108. If the distortions are greater than a predetermined threshold in step 110, then the process continues at step 104. In a preferred embodiment, the predetermined threshold may be set at 25%–30%, or 30% or less, for example. Less than 15% is considered near-perfect where it is very difficult for the human eye to detect distortions below this level.

If the distortions are less than the predetermined threshold, then the convergence distortions have been suitably corrected and the math functions are stored in a device in step 112, such as the digital TV 10. The digital TV 10 may then be shipped to consumers.

Referring again to FIG. 2, in a preferred embodiment, the math functions 38 are stored in the backup memory 22. When the digital TV 10 is subsequently powered, the CPU 20 fetches the math functions 38 and transfers the math functions 38 to the convergence control 24. The convergence control 24 is a circuit that ensures that each subpixel read from the frame buffer 16 appears in the proper location on the screen both horizontally and vertically by using the math functions to direct the functions of the deflection control 26 and the filter bank/phase control 28.

The deflection control 26 is a circuit that controls the deflection of red, green and blue electron beams. The deflection control 26 is preferably implemented in hardware because although deflection is normally performed on the scan line basis, convergence control in accordance with the present invention must be done on a pixel basis and a fast hardware implementation is needed to perform the numerous real-time calculations.

The poly phase convolution filter bank/phase control 28 and the convergence control 24 control which red or blue subpixel in a particular scan line and position in the frame buffer 16 is output during another scan line and pixel position in order to be aligned with the corresponding green subpixel when it is displayed. According to the present invention, the filter bank/phase control 28 achieves correct horizontal positioning within 15 percent by providing fine phase control to the CRT 32. This is accomplished not with filters alone, but with additional delay and advance timing circuits.

As stated above, in a preferred embodiment of the present invention, convergence correction is performed primarily during manufacturing. However, if the digital TV 10 is equipped with automatic means for measuring convergence distortion, then the digital TV 10 could be programmed to perform continuous convergence detection and correction since the scan lines of the input video signal 18 are already stored in the frame buffer 16. Additionally, through the assistance of a computer interface, a user of the TV may manually determine the distortions and input them to the controller.

An alternative embodiment, the present invention may also be implemented in devices that do not include a frame buffer 16 for storing the red, green and blue scan lines. Instead, the device could be provided with a buffer that includes only a few lines of storage. For example if red is off by N pixels, then only 2N+1 lines of storage are required for red, The same principle applies for blue.

In the preferred embodiment of the present invention, the mathematical functions are used to model red and blue distortions with respect to green for each test spot, and the mathematical functions are then applied to pixels located near each respective test spot. Although the present invention is simpler and more efficient that traditional methods for correcting distortions in a color CRT, it may be just as effective to use an even simpler technique in which distortions within subdivisions of the CRT screen are stored and used to make corrections for the area with each subdivision.

Figure 6:
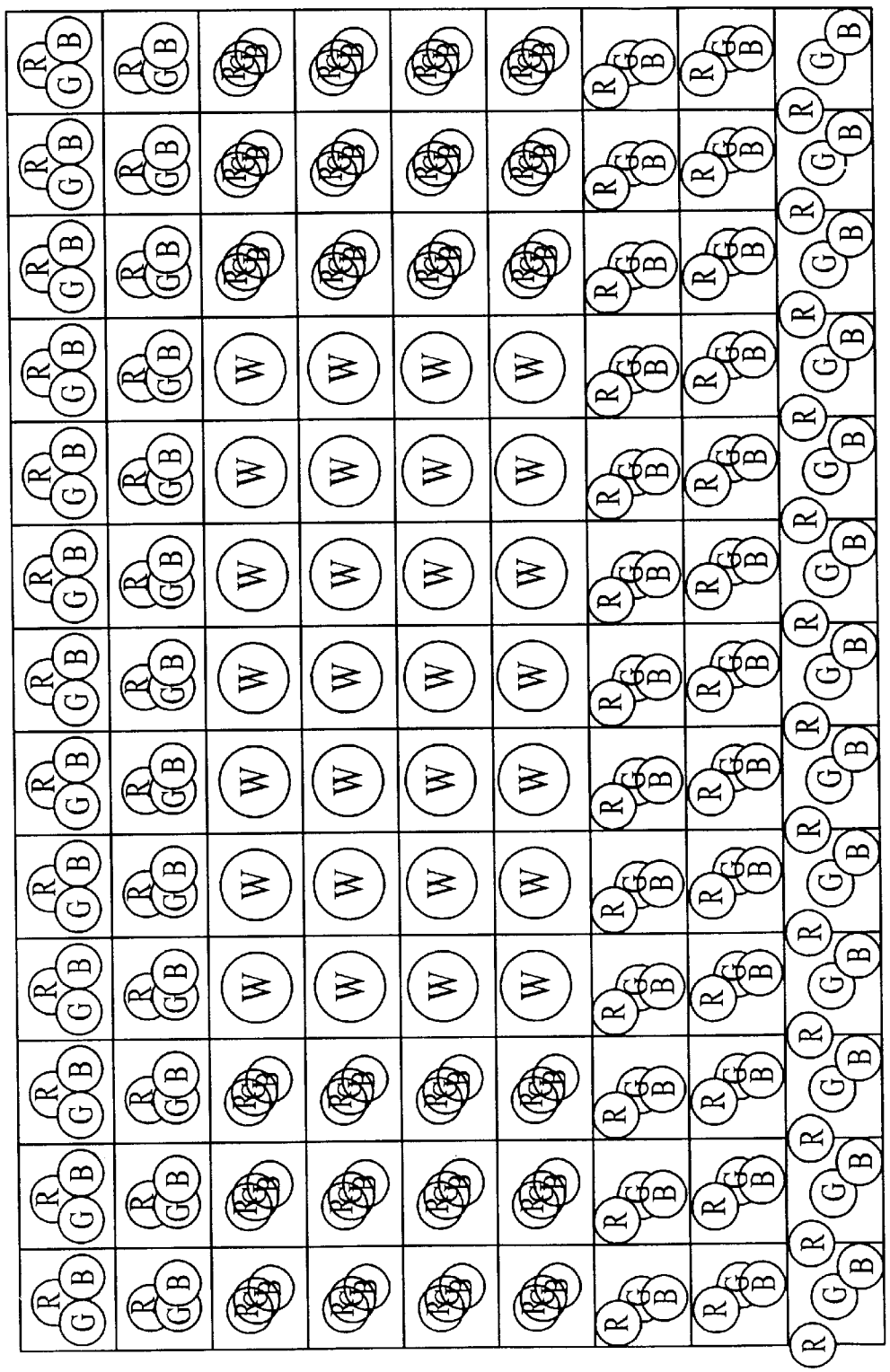
FIG. 6 is a block diagram illustrating an alternative embodiment for correcting convergence distortion in accordance with the present invention.

FIG. 6 is a block diagram illustrating an alternative embodiment for correcting convergence distortion in accordance with the present invention. An example CRT screen is shown divided into subblocks of pixels where the distortion in each block is measured and stored. The pixels in the middle of the screen are shown as displaying white pixels that have no perceptible levels of distortion.

In a preferred embodiment, the boundaries for the subblocks are chosen such that the distortions of red and blue relative to green are sufficiently similar. If the subblocks are small enough, the distortions within may be corrected to sufficient accuracy by using the same offsets for all pixels within. Consequently, in this embodiment, all that is required is sufficient local storage for each of these subblock offsets and a means for correcting the distortions. A computer controlled imaging program with suitable test screens within the display may be used to measure the distortions efficiently, and provide them to storage within the device.

According to the present invention, two-dimensional convergence correction is provided that effectively aligns the three colors so that all three electron beams are coincident on the display screen to form a nondistorted pixel. The present invention also takes advantage of the pre-existing frame buffer 16 to access the scan lines on which misaligned pixels may fall. Thus, the convergence correction does not add significantly to the cost of the digital TV 10. Once a pair of red and blue misaligned subpixels are found, the output of the subpixels are timed so that their positions are mathematically shifted left/right and/or up/down as necessary to appear on the same scan line and position of a corresponding green subpixel.

A method for providing two-dimensional convergence correction for a color cathode ray tube has been disclosed. Although the present invention has been described in accordance with the embodiments shown, one of ordinary skill in the art will readily recognize that there could be variations to the embodiments and those variations would be within the spirit and scope of the present invention. For example, although the present invention has been described in terms of a digital TV, the present invention may be used in any device that uses a CRT, such as a computer monitor, for instance. Accordingly, many modifications may be made by one of ordinary skill in the art without departing from the spirit and scope of the appended claims.

What is claimed is:

1. A method for providing two-dimensional convergence correction for a color cathode ray tube (CRT) that displays an input video signal, the video signal including a stream of video scan lines comprising red, green and blue color signals that are to be displayed on corresponding scan lines and pixel locations of a display screen, the method comprising the steps of:

(a) storing a plurality of scan lines from the video signal into a buffer;

(b) for a particular red, green and blue color signal, measuring horizontal and vertical distortions of the red and blue subpixels in relation to a position of the green subpixel on the display screen;

(c) generating at least one math function that mathematically represents the distortions; and (d) applying the math functions to a control circuitry to control timing of red and blue subpixels read from the frame buffer so that output of the red and blue subpixels are coincident with output of the green subpixel on the display screen.

2. The method of claim 1 further including the step of representing the math functions as a best fit algorithm, wherein the best bit algorithm is a polynomial function or a transcendental function.

3. The method of claim 2 further including the step of measuring convergence distortion and correcting the distortion during manufacturing.

4. The method of claim 3 further including the step of storing the math functions if the distortions are less than a predetermined threshold.

5. The method of claim 4 further including the step of setting the predetermined threshold at 25%–30%.

6. The method of claim 5 further including the step of providing the video signal as a test signal that displays multiple white test spots in each of quadrant of the display screen.

7. The method of claim 6 further including the step of displaying at least three test spots in each quadrant of the display screen.

8. The method of claim 7 further including the step of determining convergence distortion of the white test spots from visual inspection by an operator.

9. The method of claim 7 further including the step of determining convergence distortion automatically from index marks on edges of the face of the CRT and infrared detection.

10. A system for providing two-dimensional convergence correction for a color cathode ray tube (CRT) that displays an input video signal, the video signal including a stream of video scan lines comprising red, green and blue color signals that are to be displayed on corresponding scan lines and pixel locations of a display screen, the system comprising:

means for storing a plurality of scan lines from the video signal into a buffer;

means for measuring horizontal and vertical distortions of a red subpixel and a blue subpixel in relation to a position of a green subpixel on the display screen;

means for generating at least one math function that mathematically represents the distortions; and means for applying the math functions to a control circuitry to control timing of red and blue subpixels read from the frame buffer so that output of the red and blue subpixels are coincident with output of the green subpixel on the display screen.

11. The system of claim 10 wherein the math functions are represented as a best fit algorithm, wherein the best bit algorithm is a polynomial function or a transcendental function.

12. The system of claim 11 wherein convergence distortion is measured and corrected during manufacturing.

13. The system of claim 12 wherein the math functions are stored in a device if the distortions are less than a predetermined threshold.

14. The system of claim 13 wherein the predetermined threshold is set at 25%–30%.

15. The system of claim 14 wherein the video signal is a test signal that displays multiple white test spots in each of quadrant of the display screen.

16. The system of claim 15 wherein at least three test spots are displayed in each quadrant of the display screen.

17. The system of claim 16 wherein convergence distortion is determined from visual inspection by an operator.

18. The system of claim 16 wherein the convergence distortion is determined automatically from index marks on the face of the CRT and infrared detection.

19. A system for correcting convergence distortion on a cathode ray tube (CRT), comprising:

a display screen comprising a plurality of pixels;

a frame buffer for storing scan lines from a video signal, each scan line containing data for illuminating pixels on the display screen;

a frame buffer controller coupled to the frame buffer for controlling input and output of the frame buffer;

control circuitry for controlling where each pixel read from the frame buffer appears on CRT screen;

a memory for storing math functions that model convergence distortion on the cathode ray tube; and a CPU for applying the math functions to the control circuitry to control timing of red and blue subpixels read from the frame buffer so that output of the red and blue subpixels are coincident with output of the green subpixel on the display screen.

20. The system of claim 19 wherein the control circuitry includes a convergence control.

21. The system of claim 20 wherein the control circuitry includes a filter bank/phase control.

22. The system of claim 21 wherein the filter bank/phase control and the convergence control which red or blue subpixel on a particular scan line in the frame buffer is output with another scan line at its corresponding green subpixel position.

23. The system of claim 22 wherein the filter bank/phase control achieves correct horizontal positioning by providing fine phase control to the CRT using delay and timing circuits.

* * * * *